United States Patent [19]

Nakane et al.

[11] Patent Number: 5,021,295

[45] Date of Patent: Jun. 4, 1991

[54] FLAME-RETARDANT HALOGENATED POLYESTER RESIN COMPOSITION AND ELECTRIC WIRE COATED WITH THE SAME

[75] Inventors: Toshio Nakane; Michiro Naka, both of Fuji; Hiroaki Konuma, Shimizu; Kenji Hijikata, Mishima, all of Japan

[73] Assignee: Polyplastics Co., Ltd., Osaka, Japan

[21] Appl. No.: 321,068

[22] Filed: Mar. 9, 1989

[30] Foreign Application Priority Data

Mar. 14, 1988 [JP] Japan .................................. 63-60012

[51] Int. Cl.$^5$ ........................ C08L 67/02; B32B 15/02
[52] U.S. Cl. .................................... 428/379; 524/539; 525/444; 428/375
[58] Field of Search ........................ 525/444; 524/539; 428/379, 375

[56] References Cited

U.S. PATENT DOCUMENTS 4,211,689  7/1980  Borman ................................ 525/448
4,499,219  2/1985  Buxbaum ............................. 524/94

FOREIGN PATENT DOCUMENTS 59-210975  11/1984  Japan .................................. 525/444

Primary Examiner—Patricia Short
Attorney, Agent, or Firm—Birch, Stewart, Kolasch & Birch

[57] ABSTRACT

A flame-retarding polyester composition is useful for coating an electric wire, which comprises a melt-mixture of, (A) a copolyester having a halogen content of 0.5 to 30 wt. % and (B) a branched copolymer prepared by the condensation polymerization of monomers mainly comprising (a)' a component mainly comprising an aromatic dicarboxylic acid or an ester-forming derivative thereof, (b)' a component mainly comprising an aliphatic glycol or an ester-forming derivative thereof and (d) a branching compound, which contains 0.001 to 0.5 molar % (based on the total amount of the carbonyl groups of the copolyester) of said branching compound (d).

14 Claims, No Drawings

FLAME-RETARDANT HALOGENATED POLYESTER RESIN COMPOSITION AND ELECTRIC WIRE COATED WITH THE SAME

The present invention relates to a flame-retardant copolyester composition which is useful as a general industrial material necessitating flame retardance, particularly as a coating material for an electric wire. More particularly, it relates to a flame-retardant halogenated aromatic polyester resin composition comprising a branched or crosslinked polyester resin and another polyester resin containing halogen atoms in its molecule which does not lose its softness by long-term thermal history and is excellent in flame retardance, and an electric wire coated with the same.

PRIOR ART

Up to this time, rubber, polyvinyl chloride, polyethylene, polypropylene, nylon and the like have been used as a coating material for an electric wire. Particularly, polyvinyl chloride has been often used from the viewpoint of flame retardance and mechanical strengths. As the service environment of such a coating material has become severe, the level of the characteristics required with respect to the material has also enhanced. Namely, it has been required that the material be excellent in heat resistance, electrical characteristics and flame retardance and can exhibit excellent capability of forming a thin coating enough to attain space saving.

Although crosslinked polyethylene or fluororesin satisfies these requirements, the former is inferior in the capability of forming a thin coating, and the latter is expensive, thus both of these being unsatisfactory.

Polyethylene terephthalate and polybutylene terephthalate are noticed by virtue of their high capability of forming a thin coating and excellent mechanical strengths (softness and wear resistance), heat resistance and electrical characteristics. However, they are insufficient in flame retardance, so that various attempts have been made in order to improve the flame retardance. Among the attempts, a copolyester obtained by introducing a halogen compound as a comonomer into polyester is free from the bleeding of a flame retardant so that it is promising as a coating material for an electric wire or a material for electric components.

However, such a polyalkylene terephthalate copolyester is a crystalline resin, so that it exhibits significant lowering in the softness by thermal history such as thermal treatment or service in an heated state to bring about lowering in the mechanical strengths such as impact resistance. Therefore, the use of the copolyester in the vicinity of a heat source or in an environment in danger of heat buildup must be avoided, thus restricting the application thereof considerably.

An attempt of adding an elastomer to such a copolyester to thereby reduce the crystallinity as much as possible has been made for the purpose of overcoming the above disadvantage.

Although the composition according to this attempt is slightly improved in its qualities, the composition still contains crystalline resin matrix, so that it has disadvantages in that it is intolerable to long-term thermal history and that the lowering in the crystalline resin content of the composition brings about a lowering in the mechanical characteristics such as wear resistance.

SUMMARY OF THE INVENTION

In view of the above problems, the present inventors of the present invention have eagerly studied to obtain a material composition suitable as a coating material for electric wires which does not lose its softness by thermal history and is flame-retardant through the studies, the present inventors excellent in mechanical characteristics and have found that a resin composition comprising a polyester resin which contains a branched or cross linked structure and a flame-retardant halogenated aromatic polyester resin mixed therewith is suitable as the abovementioned coating material. The present invention has been accomplished on the basis of this finding.

Namely, the present invention relates to a flame-retardant halogenated polyester resin composition prepared by melt-mixing: a copolyester (A) prepared by the condensation polymerization of monomers mainly comprising
  (a) a component mainly comprising an aromatic dicarboxylic acid or an ester-forming derivative thereof,
  (b) a component mainly comprising an aliphatic glycol or an ester-forming derivative thereof and
  (c) an ester-forming halogenated compound, which has a halogen content of 0.5 to 30% by weight, with a copolyester (B) comprising a branched polymer prepared by the condensation polymerization of monomers mainly comprising
  (a)' a component mainly comprising an aromatic dicarboxylic acid or an ester-forming derivative thereof,
  (b)' a component mainly comprising an aliphatic glycol or an ester-forming derivative thereof and
  (d) a branching compound, which contains 0.001 to 0.5 molar % based on the total amount of the carbonyl groups of the copolyester) of said branching compound (d), in such a proportion that the content of the copolyester (B) is 0.1 to 50% by weight based on the total of the copolyesters (A) and (B), and an electric wire coated with the same.

It has been very difficult to simultaneously satisfy various characteristics required for the use. as a coating material for an electric wire, such as flame retardance, wear resistance and softness (flexing properties and high elongation) on the one hand, and a capability of maintaining its initial high elongation and flexing resistance even in a heated atmosphere for a prolonged period of time without losing its initial softness by thermal history on the other. Accordingly, it has been quite unexpectable that a copolyester which satisfies various characteristics required for the use as a coating material for an electric wire, particularly exhibits remarkably enhanced stability in a heated atmosphere for a prolonged period of time with reduced loss in the softness by thermal history can be obtained according to the present invention by mixing a branched or crosslinked polyester with a halogenated polyalkylene terephthalate copolymer.

The polyester resin composition to be used in the present invention will now be described in more detail.

First, the essential components constituting the halogenated aromatic copolyester (A) according to the present invention will be described. The component (a) mainly comprises an aromatic dicarboxylic acid or an ester-forming derivative thereof. Representative examples of the aromatic dicarboxylic acid or its ester-forming derivative include terephthalic acid and its derivatives. Further, the component (a) may additionally contain other dicarboxylic acid(s) such as isophthalic, naphthalenecarboxylic or naphthalenedicarboxylic acid or a derivative thereof; a fatty acid such as adipic, sebacic, trimellitic or succinic acid or an esterforming derivative thereof or an aromatic hydroxy carboxylic acid such as hydroxybenzoic or hydroxynaphthoic acid or an esterforming derivative thereof.

The component (b) constituting the copolyester (A) according to the present invention mainly comprises an aliphatic diol or an ester-forming derivative thereof. Representative examples of the aliphatic diol or its ester-forming derivative include ethylene glycol, 1,4-butylene glycol, 1,3-propanediol, 1,4-butenediol, 1,6-hexanediol and 1,8-octanediol. Further, it is possible to use a low-molecular weight diol as described above together with a high-molecular weight glycol such as polyalkylene oxide glycol, examples of which include polyethylene oxide glycol and polybutylene oxide glycol. The simultaneous use of a low-molecular weight diol with a high-molecular weight glycol is very effective in enhancing the elongation of the aromatic polyester as the composition according to the present invention and in imparting flexing resistance to the material. Further, the component (b) may additionally contain an aromatic alcohol such as bisphenol A, 4,4'-dihydroxybiphenyl or phenyl 1,4-dihydroxyphosphinate; an alkylene oxide adduct of alcohol, such as an adduct of bisphenol A with alkylene oxide such as ethylene oxide (2 mol) or propylene oxide (2 mol) or an ester-forming derivative thereof.

The copolyester (A) according to the present invention is an aromatic copolyester containing halogen atoms bonded to its molecule prepared by using an ester-forming halogenated compound (c) as a comonomer. Examples of the compound (c) to be used for this purpose are as follows, while the halogen is particularly preferably bromine:

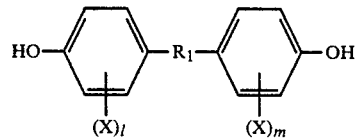
(1)

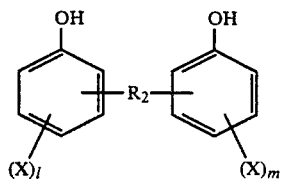
(2)

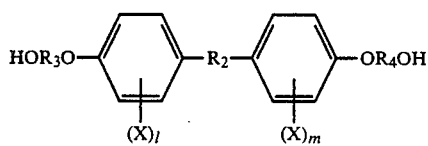
(3)

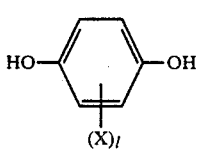
(4)

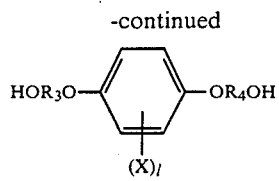
(5)

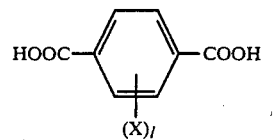
(6)

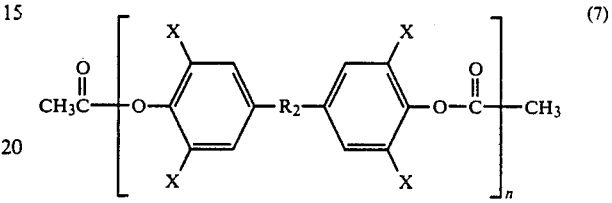
(7)

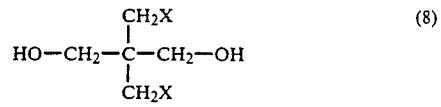
(8)

wherein

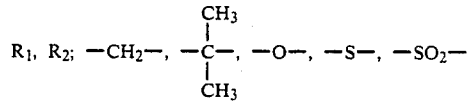

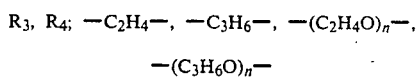

X: halogen
l, m: 1 to 4
n: an integer of 1 or above.

Preferred examples of the halogenated compound to be incorporated as a comonomer include those represented by the general formulae (1) to (7). Preferably said halogenated compound is one containing at least four halogen atoms in its molecule. When the halogen is bromine, the compound of general formula (1) includes tetrabromobisphenol A and tetrabromobisphenol sulfone; the compound of general formula (2) includes tetrabromobisphenol F; the compound of general formula (3) includes an adduct of tetrabromobisphenol A with ethylene oxide (2 mol), an adduct of tetrabromobisphenol A with propylene oxide (2 mol), an adduct of tetrabromobisphenol sulfone with ethylene oxide (2 mol) and an adduct of tetrabromobisphenol sulfone with propylene oxide (2 mol); the compound of general formula (4) includes tetrabromohydroquinone; the compound of general formula (5) includes an adduct of tetrabromohydroquinone with ethylene oxide (2 mol); the compound of general formula (6) includes tetrabromoterephthalic acid and the compound of general formula (7) includes polycarbonate of tetrabromobisphenol A.

The halogenated compound to be incorporated as a comonomer preferably has a molecular weight of at least 390. If the molecular weight of the compound is too low, no contribution will be made to improvement in the oxygen index which is an indication of flame retardance. Further, the halogenated compound still preferably contains at least one aromatic ring in its molecule.

The halogenated compound is added in such an amount as to give a halogen content of the resulting copolymer of 0.5 to 30% by weight, preferably 2 to 20% by weight. If the halogen content is less than 0.5% by weight, sufficient flame retardance will not be attained, while if it exceeds 30% by weight, the mechanical properties will unfavorably lower.

The ratio of the monomers to be used in the preparation of the copolyester according to the present invention will be described. When the ester-forming functional group of halogenated compound (c) is an alcohol group, the total amount of components (b) and (c) per 100 mol of component (a) may be 90 to 200 mol, preferably 95 to 150 mol. When the ester-forming functional group thereof is a carboxyl group, the amount of component (b) per 100 mol of components (a) and (c) may be 90 to 200 mol, preferably 95 to 150 mol.

When a coating material having a higher oxygen index is desired depending upon the service condition, one having an objective high oxygen index can be obtained by suitably selecting the content of component (c) to thereby control the halogen content of the copolymer.

Now the components of branched or crosslinked copolyester (B) will be described. Component (a)' mainly comprises, like component (a), an aromatic dicarboxylic acid or an ester-forming derivative thereof. Representative examples of the aromatic dicarboxylic acid or its ester-forming derivative include terephthalic acid and its derivatives. Further, component (a) may additionally contain other dicarboxylic acid(s) such as isophthalic, naphthalenecarboxylic or naphthalenedicarboxylic acid or a derivative thereof; a fatty acid such as adipic, sebacic, trimellitic or succinic acid or an ester-forming derivative thereof or an aromatic hydroxy carboxylic acid such as hydroxybenzoic or hydroxynaphthoic acid or an ester-forming derivative thereof.

Component (a)' may be either the same with or different from component (a) from the viewpoint of the present invention.

Component (b)' mainly comprises, like component (b), an aliphatic diol or an ester-forming derivative thereof. Representative examples of the aliphatic diol or its ester-forming derivative include ethylene glycol, 1,4-butylene glycol, 1,3-propanediol, 1,4-butenediol, 1,6-hexanediol and 1,8-octanediol. Further, it is possible to use a low-molecular weight diol as described above together with a high-molecular weight glycol such as polyalkylene oxide glycol, examples of which include polyethylene oxide glycol and polybutylene oxide glycol. The simultaneous use of a low-molecular weight diol with a high-molecular weight glycol is very effective in enhancing the elongation of the aromatic polyester as the coating material for an electric wire according to the present invention and in imparting flexing resistance to the material. Further, component (b) may additionally contain an aromatic alcohol such as bisphenol A, 4,4'-dihydroxybiphenyl or phenyl 1,4-dihydroxyphosphinate; an alkylene oxide adduct of alcohol, such as an adduct of bisphenol A with alkylene oxide such as ethylene oxide (2 mol) or propylene oxide (2 mol) or an ester-forming derivative thereof.

Component (b)' may be either the same with or different from component (b).

The branching compound to be used as component (d) according to the present invention has at least three functional groups selected from among carboxyl and hydroxyl groups and ester-forming groups derived therefrom. These functional groups may be the same or different from each other.

Examples of compound (d) having such functional groups include trimesic, trimellitic, pyromellitic, mellitic, butanetricarboxylic and butenetricarboxylic acids and alkyl esters thereof; acid anhydrides such as trimellitic anhydride; glycerol, trimethylolpropane, trimethylolhexane, pentaerythritol, dipentaerythritol, 1,3,5-trimethylolbenzene, 1,3,5-triethylolbenzene, 2,2,6,6-tetramethylolcyclohexanol and esters thereof with lower carboxylic acids and hydroxy carboxylic acid such as 5-hydroxyisophthalic acid and derivatives thereof.

Among them, alkyl trimesate, alkyl trimellitate, glycerol, trimethylolpropane and pentaerythritol are preferred.

According to the present invention, a specified amount of branching compound (d) is used to thereby introduce a branched structure of a proper degree into a polyester.

If a branched structure of too high a degree is introduced into a halogenated polyester, the resulting copolymer will form a three-dimensional network, so that it will be brittle to cause gelation finally. However, a copolymer obtained by introducing a branched structure into a halogenated polyester by the addition of a specified amount of component (d) according to the present invention does not lose the softness resulting from the polyester and can maintain the strength and softness resulting therefrom, even if the chain of the copolymer somewhat causes cleavage by long-term thermal history.

Branching compound (d) is copolymerized in such an amount as to give a content of 0.001 to 0.5 molar %, preferably 0.01 to 0.5 molar % based on the total content of the carbonyl groups of the copolymer. If the content of component (d) is less than 0.001 molar %, no preventive effect on the lowering of softness due to thermal history will be attained, while if the content is more than 0.5 molar %, the resulting copolymer will exhibit too high a viscosity or will be converted into a three-dimensional insoluble and infusible copolymer, so that it will be poor in processability to cause problems in the application thereof to an electric wire.

Copolymers (A) and (B) to be used in the present invention can be prepared by any conventional method such as melt polymerization, interfacial polymerization or solid phase polymerization, and may have an intrinsic viscosity of 0.5 to 3.0.

The composition of the present invention is one prepared by melt-mixing the copolymer (A) with copolymer (B) in such a proportion that the content of copolymer (B) is 0.1 to 50% by weight, preferably 0.1 to 30% by weight based on the total of copolymers (A) and (B). When the content of copolymer (B) is less than 0.1% by weight, no preventive effect on the lowering of softness due to thermal history will be attained, while if the content exceeds 50% by weight, the halogen content of the composition will be reduced to lower the flame-retardant effect, thus both of them being unsuitable for obtaining a coating material for electric wires, etc.

The melt mixing of polymer (A) with polymers (B) may be conducted also with an ordinary extruder. A transesterification catalyst such as tetrabutyl titanate may be added to effect uniform dispersion between polymer (A) and polymer (B).

Various additives may be added to the copolymer for the purpose of enhancing the performance, if necessary. Examples of such additives include stabilizers such as antioxidant and ultraviolet absorber, antistatic, flame-retardant auxiliary, coloring agent such as dye and pigment, lubricant for imparting fluidity or mold release characteristics, lubricating agent, crystallization accelerator (nucleating agent) and inorganic substances. Particularly, the addition of an antioxidant preferably serves to enhance the effect of preventing heat deterioration.

Examples of the stabilizers include hindered phenols, amines and phosphorus compounds.

Particular examples of the hindered phenol include 2,2-methylenebis(4-methyl-6-t-butylphenol), hexamethylene glycol bis(3,5-di-t-butyl-4-hydroxyhydrocinnamate), tetrakis[methylene(3,5-di-t-butyl4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl 3-(4'-hydroxy-3',5'-di-t-butylphenyl)-propionate, 4,4'-methylenebis(2,6-di-t-butylphenol), 4,4'-butylidenebis(6-t-butyl-3-methylphenol), 2,2'-thiodiethyl bis[3-(3,5-di-t-butyl-4-hydroxyphenyl)propionate, distearyl-3,5-di-t-butyl-4-hydroxybenzylphosphonate and 2-t-butyl-6-(3-t-butyl-5-methyl-2-hydroxybenzyl)-4-methylphenyl acrylate. These compounds may be used either alone or as a mixture of two or more. Among the compounds, hexamethylene glycol bis(3,5-di-t-butyl-4-hydroxyhydrocinnamate), tetrakis[methylene(3,5-di-t-butyl-4-hydroxyhydrocinnamate)]methane and triethylene glycol bis-3-(3-t-butyl-4-hydroxy-5-methylphenyl)propionate are particularly preferred.

Particular examples of the amine include N-phenyl-N'-isopropyl-p-phenylenediamine, N,N'-diphenyl-p-phenylenediamine, 4,4'-bis(4-α,α-dimethylbenzyl)diphenylamine, condensate of diphenylamine with acetone, N-phenylnaphthylamine and N,N'-di-β-naphthylphenylenediamine.

Particular examples of the phosphorus compound include phosphonites represented by general formula (9):

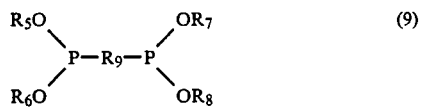

wherein $R_5$, $R_6$, $R_7$ and $R_8$ may be the same or different from each other and each stand for an alkyl, substituted alkyl, aryl or substituted aryl group having 1 to 25 carbon atoms. Examples thereof include methyl, ethyl, butyl, octyl, decyl, lauryl, tridecyl, stearyl, phenyl and alkyl- and/or alkoxy-substituted phenyl groups; $R_9$ stands for an alkylene or substituted alkylene group having 4 to 33 carbon atoms, and an arylene or substituted arylene group. Examples thereof include butylene, octylene, phenylene, naphthylene, diphenylene groups and groups represented by the general formula:

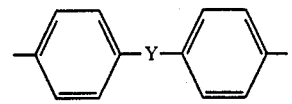

(wherein Y stands for an oxy, sulfonyl, carbonyl, methylene, ethylidene, butylidene, isopropylidene or diazo group). Particularly, tetrakis(2,4-di-t-butylphenyl)4,4'-diphenylenediphosphonite is preferred.

The amount of the stabilizer to be added is 0.01 to 3% by weight, preferably 0.1 to 2% by weight, based on the total amount of the composition.

The flame-retardant auxiliary includes antimony compounds such as antimony trioxide and antimony halides; compounds containing a metal such as zinc or bismuth; clayey silicates such as magnesium hydroxide and asbestos and halogenated polymers such as brominated polycarbonate and brominated epoxy resins.

Inorganic fillers may be additionally used according to the purpose. They include conventional inorganic fibers such as glass fiber, ceramic fiber, boron fiber, potassium titanate fiber and asbestos; powdery or granular materials such as potassium carbonate, highly dispersible silicate, alumina, aluminum hydroxide, talc, clay, mica, glass flake, glass powder, glass bead, quartz powder, quartz sand, wollastonite, carbon black, barium sulfate, plaster of paris, silicon carbide, alumina, boron nitride and silicon nitride; lamellar inorganic materials and whiskers.

These inorganic fillers may be used alone or as a mixture of two or more.

Further, one or more organic polymers may be additionally used to improve the coating by melt extrusion, slipperiness, softness and the like. They include, for example, other polyesters, polyamides, polyolefins and copolymers thereof, low molecular weight polyesters, polycarbonate, polyurethane, rubbery polymers such as butyl rubber and ABS, polyphase copolymers comprising polyacrylate resins, and thermoplastic segment type copolyesters (these copolymers including graft copolymers).

An electric wire can be coated with the composition of the present invention by any ordinary method known to the art. Generally, a coating material is applied to a travelling conductor by melt extrusion. The application may be carried out either by extruding a coating material in the same direction as that of the travelling or by using a cross-head having a certain angle against the direction of the travelling.

The use of a screw extruder is preferable, because the flow rate of a coating material can be easily controlled thereby.

The non-uniformity in coating thickness is detected by an ordinary method using X-rays, ultrasonic wave or the like.

The degree of eccentricity resulting from the non-uniformity in coating thickness is shown by concentricity ratio $e_c$:

$$e_c = \frac{e_{min}}{e_{max}} \times 100$$

$e_{min}$: minimum cross section thickness of coating
$e_{max}$: maximum cross section thickness of coating A higher $e_c$ value is more desirable and the $e_c$ is preferably at least 65%, still preferably at least 70%.

The non-uniformity of coating thickness may be controlled by detecting the non-uniformity with a detector, followed either by automatically or manually adjusting the clearance between a die of a screw extruder and a conductor at the center of the die, or by adjusting the flow rate of a coating material together with pressure and temperature.

The use of a non-eccentric head is effective in reducing the non-uniformity of coating thickness.

According to the present invention, after an electric wire coated with the coating material of the present invention has been shaped, the wire may be passed through a heating zone for the purpose of further enhancing the mechanical strengths of the coating. The temperature of the heating zone may be lower than the melting point of the coating material and higher than the glass transition temperature thereof.

The flame-retardant halogenated aromatic polyester resin composition according to the present invention are remarkably improved in the resistance to lowering in the physical properties due to thermal history, as compared with conventional coating materials, to bring about the following advantages:

(1) they exhibit high flame retardance and are improved in the resistance to lowering in the physical properties due to thermal history, so that they are useful for an electric wire to be used in the vicinity of a heat source, an engine of a transport or a heat buildup part of an electrical appliance, (2) the thickness of a coating can be reduced without adversely affecting the mechanical and electrical characteristics. Further, they are excellent in flexing properties, so that an effective utilization of a limited space can be dramatically enhanced. Therefore, they are particularly useful for an electric wire to be used in a space rocket characterized by highly accumulated data and limited spatial capacity, airplanes, transports such as an automobile, electrical appliances, computers or other information processing equipment, and (3) they contain a halogen compound incorporated thereinto, so that they are free from bleeding of a flame retardant at high temperature, though such problems are caused in the coating material according to the prior art. Therefore, an electrical wire coated with the copolymer or composition of the present invention exhibits an excellent appearance and does . not cause blocking thereof with each other in its production to lower the coating cost.

The coating material according to the present invention has characteristics as described above, so that it is useful not only for an electric wire to be used in transport, electric, electronic and information equipment and other machines, but also for various equipment and devices requiring the above characteristics.

EXAMPLES

The following Examples will further illustrate the present invention, which by no means limit the invention.

Referential Example 1

Preparation of halogenated aromatic polyester A-1

970 parts by weight of dimethyl terephthalate, 513 parts by weight of 1,4-butanediol, 158 parts by weight of ethylene oxide (2 mol) adduct of tetrabromobisphenol A and 0.7 part by weight of tetrabutoxytitanium were fed into a reactor provided with a stirrer, a nitrogen inlet tube and an outlet tube. The mixture was stirred at 160° C. in a nitrogen stream for 30 min. Then the temperature was gradually elevated and the mixture was heated at 200° to 270° C under stirring for 2 h. After the introduction of nitrogen was stopped, the pressure in the reactor was gradually reduced in such a manner that the pressure reached 0.3 mmHg in 30 min. The stirring was continued under this pressure for 3 h. The polymer thus formed had an intrinsic viscosity of 1.0 and a bromine content of 6.5 wt.%.

Referential Example 2

Preparation of halogenated aromatic polyester A-2)

970 parts by weight of dimethyl terephthalate, 513 parts by weight of 1,4-butanediol, 171 parts by weight of propylene oxide (2 mol) adduct of tetrabromobisphenol sulfone and 0.7 part by weight of tetrabutoxytitanium were fed into a reactor provided with a stirrer, a nitrogen inlet tube and an outlet tube. The mixture was stirred at 160° C. in a nitrogen stream for 30 min. Then the temperature was gradually elevated and the mixture was heated at 200° to 270° C. under stirring for 2 h. After the introduction of nitrogen was stopped, the pressure in the reactor was gradually reduced in such a manner that the pressure reached 0.3 mmHg in 30 min. The stirring was continued at 270° C. under this pressure. The polymer thus formed had an intrinsic viscosity of 1.1 and a bromine content of 6.3 wt.%.

Referential Example 3

Preparation of halogenated aromatic polyester A-3), 900 parts by weight of dimethyl terephthalate, 513 parts by weight of 1,4-butanediol, 50 parts by weight of polybutylene oxide glycol having an average molecular weight of 400, 158 parts by weight of ethylene oxide (2 mol) adduct of tetrabromobisphenol A and 0.7 part by weight of tetrabutoxytitanium were fed into a reactor provided with a stirrer, an nitrogen inlet tube and an outlet tube. The mixture was stirred at 180° C. in a nitrogen stream for 30 min. Then the temperature was gradually elevated and the mixture was heated at 200° C. to 270° C. under stirring for 3 h. After the introduction of nitrogen was stopped, the pressure in the reactor was gradually reduced in such a manner that the pressure reached 0.5 mmHg in 15 min. The stirring was continued under this pressure for 6 h. The polymer thus formed had an intrinsic viscosity of 1.0 and a bromine content of 6.5 wt.%.

Referential Example 4

Preparation of branched or crosslinked polyester B-1)

100 parts by weight of dimethyl terephthalate (DMT), 70 parts by weight of 1,4-butanediol (BD) and 0.26 part by weight of trimethyl trimesate (TMT) were fed into a reactor provided with a stirrer, a nitrogen inlet tube and an outlet tube. 0.15 part by weight of tetrabutoxytitanium was added thereto and the mixture was stirred at 180° C. in a nitrogen stream for 30 min. Methanol thus formed as distilled off.

After the introduction of nitrogen was stopped, the pressure in the reactor was gradually reduced and simultaneously the temperature was gradually elevated. Finally the mixture was kept at 250° C. under a pressure of 0.1 mmHg for 2.5 h to complete the polymerization.

The polymer thus formed had an intrinsic viscosity of 1.3 and a TMT content of 0.1 molar % based on the total carbonyl groups of the polymer.

Referential Example 5

Preparation of branched or crosslinked polyester B-2)

The polymerization was conducted in the same manner as that of Referential Example 4 except that 100 parts by weight of DMT, 70 parts by weight of BD and 0.17 part by weight of 1,3,5-trimethylolbenzene (TMB) were used as the starting materials to form a polymer having an intrinsic viscosity of 1.3 and a TMB content of 0.1 molar % based on the total carbonyl groups of the polymer.

Referential Example 6

Preparation of branched or crosslinked polyester B-3)

100 parts by weight of DMT, 70 parts by weight of BD and 16.3 parts by weight of ethylene oxide (2 mol) adduct of tetrabromobisphenol A (flame retardant A) and 0.026 part by weight of TMT were fed into a reactor provided with a stirrer, a nitrogen inlet tube and an outlet tube. A given amount of a catalyst was added thereto and the mixture was stirred at 180° C. in a nitrogen stream for 30 min. Methanol thus formed was distilled off.

After the introduction of nitrogen was stopped, the pressure in the reactor was gradually reduced and the temperature was gradually elevated. Finally the mixture was kept at 250° C. under a pressure of 0.1 mmHg for 2.5 h to complete the polymerization.

The polymer thus formed had an intrinsic viscosity of 1.0, a TMT content of 0.01 molar % based on the total carbonyl groups of the polymer and a bromine content of 6.5 wt.%.

Examples 1 to 8

The polymers prepared in Referential Examples 1 to 6 were melt-mixed in amounts shown in Table 1 and pelletized with an ordinary extruder.

The pellets thus obtained were molded into test pieces with an injection molding machine by an ordinary process and the physical properties of these were examined.

The physical properties were each determined as follows:

Namely, the tensile strength and elongation (%) were determined according to ASTM D 638. The dielectric breakdown was determined according to the ASTM D 149 short-time test and the permittivity was determined according to DISO (1 kHz), while the oxygen index as an indication of flame retardance was determined according to JIS K 7201. The appearance was determined by observing it after the storage at 120° C. for 500 hours to evaluate a case wherein an abnormal phenomenon such as bleeding or blister was observed as "X" and a case wherein no abnormal phenomenon was observed as "O". Further, a test piece for the tensile test was stored in a thermostatic chamber of 120° C. for 500 hours to determine its strength and elongation according to the same manner as the one described above. Furthermore, the resin according to the present invention was applied to a stranded copper conductor having a diameter of 1 mm in a thickness of 0.2 mm with an extruder fitted with a cross head and the resulting coated electric wire was examined for wear resistance according to JIS C 3406. The wear resistance was evaluated by using a stranded copper conductor having a diameter of 1 mm which had been coated with polyvinyl chloride (PVC) in a thickness of 0.5 or 1 mm as a standard (the former is referred to as standard wire A, while the latter as standard wire B) to show a case wherein the minimum wear resistance is lower than the wear resistance of the standard wire A by "X", a case wherein it is between the wear resistance of the standard wire A and that of the standard wire B by "Δ" and a case wherein it is higher than the wear resistance of the standard wire B by "O".

The mixing ratios and the results of the determination of the physical properties are shown in Table 1.

Comparative Examples 1 to 3

The physical properties of the polyesters A-1, A-2 and A-3 prepared in Referential Examples 1 to 3 but free from polymer (B) were examined.

The results are shown in Table 1.

Comparative Example 4

The polymerization was conducted in the same manner as that of Referential Example 6 except that 2.6 parts by weight of TMT was used. In this process, the load on the stirrer was sharply increased after conducting the polymerization at 250° C. under a pressure of 0.1 mmHg so that the reaction was stopped.

Resulting polymer (B-4) partially comprised an insoluble, infusible three-dimensional polymer and it could not be homogeneously mixed with polymer A-1 by fusion. Therefore, no further examination was conducted.

Comparative Example 5

Polybutylene terephthalate (PBT) having an intrinsic viscosity of 1.1 was mixed with 5 wt.% of decabromodiphenyl ether (flame retardant B) through powder mixing and the mixture was pelletized to form uniform pellets with an ordinary extruder.

The pellets were examined in the same manner as that of Example 1.

The results are shown in Table 1.

Comparative Example 6

Polyvinyl chloride (PVC) not containing any flame retardant was examined and evaluated in a similar manner to the one described in Example 1. The test piece made of PVC was too distorted by the thermal treatment at 120° C. to determine the physical properties thereof.

The results are shown in Table 1.

TABLE 1

|  |  | Examples | | | | | | | |
| --- | --- | --- | --- | --- | --- | --- | --- | --- | --- |
|  |  | 1 | 2 | 3 | 4 | 5 | 6 | 7 | 8 |
| A-1 | (pts. wt.) | 99 | 90 | 80 | — | — | — | — | 60 |
| A-2 | (pts. wt.) | — | — | — | 90 | 80 | — | — | — |
| A-3 | (pts. wt.) | — | — | — | — | — | 90 | 80 | — |
| B-1 | (pts. wt.) | 1 | 10 | — | 10 | — | 10 | — | — |
| B-2 | (pts. wt.) | — | — | 20 | — | 20 | — | 20 | — |

TABLE 1-continued

| | | | | | | | | | |
|---|---|---|---|---|---|---|---|---|---|
| B-3 | (pts. wt.) | — | — | — | — | — | — | — | 40 |
| Tensile strength | (kg/cm$^2$) | 565 | 571 | 573 | 569 | 566 | 485 | 488 | 495 |
| Tensile elongation | (%) | 300< | 300< | 300< | 300< | 300< | 300< | 300< | 300< |
| Dielectric breakdown | | 17 | 17 | 17 | 16 | 17 | 17 | 17 | 17 |
| Permittivity | | 3.3 | 3.3 | 3.3 | 3.3 | 3.3 | 3.3 | 3.3 | 3.2 |
| Oxygen index | | 27 | 27 | 26 | 27 | 26 | 27 | 26 | 27 |
| After the | tensile strength (kg/cm$^2$) | 578 | 591 | 591 | 580 | 579 | 501 | 503 | 520 |
| thermal | elongation (%) | 238 | 246 | 264 | 240 | 255 | 234 | 243 | 156 |
| treatment | appearance | O | O | O | O | O | O | O | O |
| for 500 hours | | | | | | | | | |
| Minimum wear resistance | | O | O | O | O | O | O | O | O |

| | | Comparative Examples | | | | |
|---|---|---|---|---|---|---|
| | | 1 | 2 | 3 | 5 | 6 |
| A-1 | (pts. wt.) | 100 | — | — | PBT | PVC |
| A-2 | (pts. wt.) | — | 100 | — | (95) | (100) |
| A-3 | (pts. wt.) | — | — | 100 | decabromo- | |
| B-1 | (pts. wt.) | — | — | — | diphenyl | |
| B-2 | (pts. wt.) | — | — | — | ether | |
| B-3 | (pts. wt.) | — | — | — | (5) | |
| Tensile strength | (kg/cm$^2$) | 543 | 525 | 450 | 568 | 220 |
| Tensile elongation | (%) | 300< | 300< | 300< | 300< | 250 |
| Dielectric breakdown | | 17 | 16 | 17 | 16 | 29 |
| Permittivity | | 3.3 | 3.3 | 3.3 | 3.1 | 3.1 |
| Oxygen index | | 27 | 27 | 27 | 28 | 27 |
| After the | tensile strength (kg/cm$^2$) | 566 | 549 | 467 | 582 | — |
| thermal | elongation (%) | 75 | 78 | 111 | 174 | — |
| treatment | appearance | O | O | O | X | — |
| for 500 hours | | | | | | |
| Minimum wear resistance | | O | O | O | Δ | X |

Agent: Kaoru Furuya

We claim:

1. A flame-retardant halogenated polyester resin composition prepared by melt-mixing:
   copolyester (A) prepared by the condensation polymerization of monomers mainly comprising
   - (a) a component mainly comprising an aromatic dicarboxylic acid or an ester-forming derivative thereof,
   - (b) a component mainly comprising an aliphatic glycol or an ester-forming derivative thereof and
   - (c) an ester-forming halogenated compound, which has a halogen content of 0.5 to 30% by weight, with copolyester (B) comprising a branched polymer prepared by the condensation polymerization of monomers mainly comprising (a)' a component mainly comprising an aromatic dicarboxylic acid or an ester-forming derivative thereof,
   - (b)' a component mainly comprising an aliphatic glycol or an ester-forming derivative thereof and
   - (d) a branching compound having at least three functional groups selected from a carboxyl group, a hydroxyl group, an ester-forming group derived therefrom or mixtures thereof, which contains 0.001 to 0.5 molar % (B), of said branching compound (d), in such a proportion that the content of copolyester (B) is 0.1 to 50% by weight based on the total of copolyesters (A) and (B).

2. The polyester resin composition according to claim 1, wherein said aliphatic glycols (b) and (b)' are each C$_{2-8}$ low-molecular weight glycols and/or polyalkylene oxide glycols having a molecular weight of from 200 to 4000.

3. The polyester resin composition according to claim 2, wherein said C$_{2-8}$ low-molecular weight glycol is at least one member selected from the group consisting of ethylene glycol, 1,4-butylene glycol and 1,4-butene glycol.

4. The polyester resin composition according to claim 1, 2 or 3, wherein said ester-forming halogenated compound (c) is selected from formula

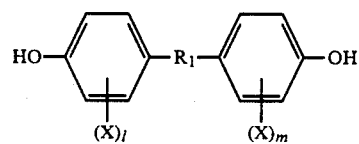

(1)

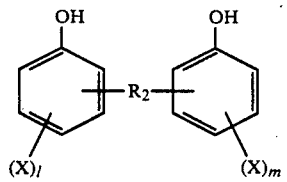

(2)

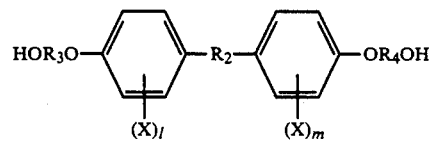

(3)

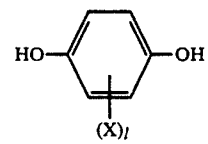

(4)

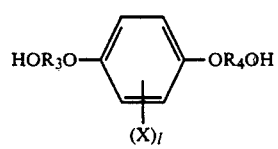

(5)

(6)

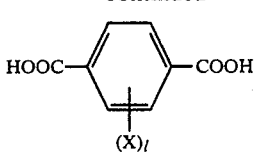

(7)

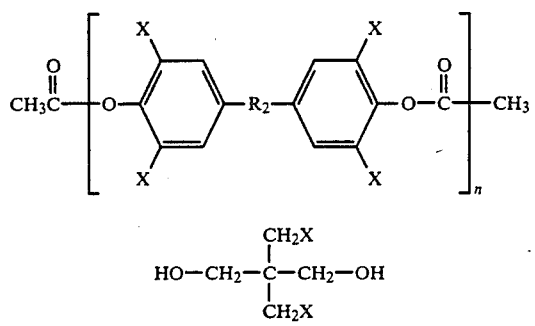

(8)

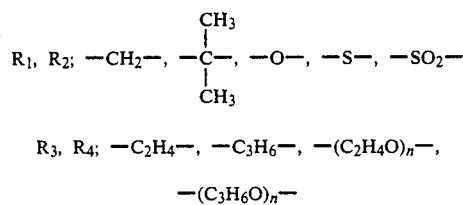

wherein $$R_1, R_2; -CH_2-, -\underset{\underset{CH_3}{|}}{\overset{\overset{CH_3}{|}}{C}}-, -O-, -S-, -SO_2-$$

$R_3, R_4; -C_2H_4-, -C_3H_6-, -(C_2H_4O)_n-,$ $-(C_3H_6O)_n-$

X: halogen l, m: 1 to 4 n: an integer of 1 or above.

5. The polyester resin composition according to claim 1, 2 or 3 wherein said halogen is bromine.

6. The polyester resin composition according to claim 1, 2 or 3, wherein copolyester (B) further comprises an ester-forming halogenated compound (c)'.

7. A polyester resin composition prepared by adding 0,01 to 3% by weight, based on the total amount of the composition, of a stabilizer to the polyester resin composition according to claim 1, 2 or 3.

8. An electric wire coated with a coating material comprising the polyester resin composition according to claim 1, 2 or 3.

9. The electric wire according to claim 8, wherein said electric wire is a low-voltage electric wire.

10. A polyester resin composition prepared by adding 0.01 to 3% by weight, based on the total amount of the composition, of a stabilizer to the polyester resin composition according to claim 6.

11. The electric wire coated with a coating material comprising the polyester resin composition according to claim 6.

12. The electric wire coated with a coating material comprising the polyester resin composition according to claim 7.

13. The electric wire according to claim 11, wherein said electric wire is a low-voltage electric wire.

14. The electric wire according to claim 12, wherein said electric wire is a low-voltage wire.

* * * * *